(No Model.)
F. N. DU BOIS.
WASTE PIPE TRAP.
No. 475,546. Patented May 24, 1892.
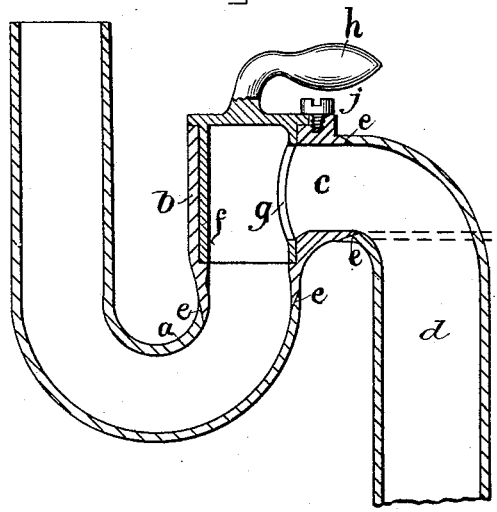
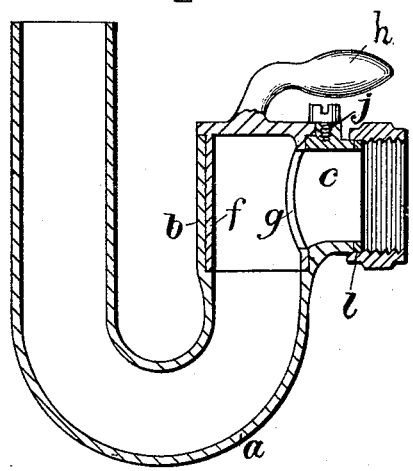
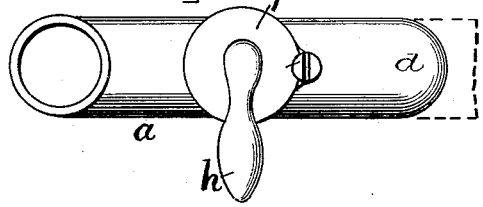
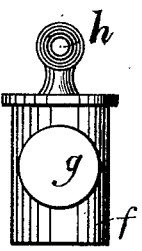
WITNESSES
N. B. Earll
O. J. Morgan
INVENTOR.
Fredk N DuBois
By A P Thayer
atty

UNITED STATES PATENT OFFICE.

FREDERICK N. DU BOIS, OF NEW YORK, N. Y.

WASTE-PIPE TRAP.

SPECIFICATION forming part of Letters Patent No. 475,546, dated May 24, 1892.

Application filed June 25, 1891. Serial No. 397,557. (No model.)

*To all whom it may concern:*

Be it known that I, FREDERICK N. DU BOIS, a citizen of the United States, and a resident of New York city, in the county of New York and State of New York, have invented certain new and useful Improvements in Waste-Pipe Traps, of which the following is a specification.

The object of my invention is to produce a U-shaped trap connected to the discharge-pipe by an intermediate hard-metal section, in which is placed an open-bottom turn-cock valve axially in line with one leg of the trap proper and having a lateral discharge into the delivery-section, so as to form the delivery-bend of the trap.

In the annexed drawings, making part of this specification, Figure 1 is a vertical section of a trap in which the water-seal and delivery sections are of wrought or cast lead connected by soldering to the intermediate hard-metal section. Fig. 2 is a similar section of a trap formed entirely of brass or other suitable cast hard metal. Fig. 3 is a plan view of the trap of Fig. 1. Fig. 4 is an elevation of the turn-cock valve.

The same letters are employed in all the figures in the designation of the identical parts.

The U-formed section which forms the trap proper is indicated at $a$. This section may be made all of brass or other suitable composition metal by casting in one piece, as shown in Fig. 2; or the valve and casing $b$ may be cast in hard metal and the rest of the trap of cast or wrought lead, the parts being soldered or otherwise united, as shown in Fig. 1. An open-bottom turn-cock or valve $f$, which, unlike the ordinary faucet, is cylindrical instead of tapered, is placed in the section $b$, and as its receiving and discharging openings are in planes at right angles to one another it forms in whole or in part one of the bends where the water is deflected at or nearly at right angles in passing from the receiving to the discharging pipe or section. The water being delivered through the water seal or trap proper $a$ enters the open bottom of the turn-cock or valve $f$ and passes out at $g$ into the discharge $c$, which is cast integral with the valve-casing $b$ and in practical use would be connected by soldering, as shown at $e$ in Fig. 1, or by a coupling, as shown at $l$ in Fig. 2, with a discharge-pipe, (shown at $d$, Fig. 1,) which may lead away the water in any desired direction. This pipe $d$ may or may not form a part of the trap as sold.

The trap as an article of manufacture is made up of the U-formed section $a$, which forms the trap proper, the part $b$, whether integral with or connected to the trap $a$, the open-bottom plug $f$, which as it discharges the water in a line substantially at right angles to the line in which it receives it forms one of the bends of the trap, and the part $c$. The open-bottom plug thus forms one of the bends and is the element which connects the receiving and discharging ends of the trap. It is placed axially in the line of the trap proper, and its bore being identical with that of the leg to which it is connected it affords no lodging place for the fibrous and fuzzy and other matters so liable to gather wherever they can lodge against the wall of a trap. So, also, the bore of the lateral opening is coincident with the bore of the discharge-pipe with which it is connected.

The turn-cock or valve, as shown in Fig. 4, is cup-formed, being open at the bottom and with a lateral discharge at $g$. The upper end is closed by a head and formed with a handle $h$, by which it is turned. It extends above the end of the trap proper, as shown at $i$, and is held in place by the head-screw $j$, tapped into a leg on the trap, or by a flange or catch of any sort which will permit the valve to be turned freely, but not allow it to be withdrawn until freed by withdrawing the catch, and then the valve may be taken out to give ready access to the interior of the trap in its axial line for cleaning it, thus taking the place of the plugs commonly tapped into the traps at their bends for the same purpose.

The wall of the brass section or portion $b$, which receives the turn-cock or valve, is extended above the plane of the top of the discharge-opening, and as that is of the full diameter of the open bottom the water in flowing through will not rise to the level of the top of the vertical leg or valve-chamber, and consequently will not overflow, and any leakage into the space around the valve will find its discharge through the outlet $c$, and consequently the valve and its seat if carefully turned and fitted will not require to be ground.

Horizontally the valve-opening $g$ will be in perfect register with the discharge $c$, but when for any reason the trap is not to be used for any time sufficient to cause the evaporation of the water in the trap the valve should be turned out of register, and thus the escape of poisonous gas from the sewer into the apartment will be effectually prevented. This is liable to occur not only in houses which are closed for a season, but also in apartments in infrequent use or in cases where a deficient head of water leaves the basins, &c., in the upper rooms above the reach of the water-supply and so liable to lose by evaporation the water which makes the seal.

I am aware of Letters Patent No. 302,728, in which a trap formed with a loop like that of a trumpet was made with a three-way cock in the bottom of the loop and across the same to serve as a drain or a stop cock, according to its position. Not only was that trap, as a whole, of an entirely different class from mine, but it had the inevitable defects inherent in such a stop-cock placed across the bore of a pipe—viz., it requires to be double the circumference and a little more in order that the circular holes shall register with two opposite pipes and have an equal amount of blank wall, with which they register when the connection is to be cut off, plus a little lap. To double the circumference, the diameter is doubled, and consequently a turn-cock which is placed across a conduit-pipe to close or open the current must have double the weight of brass and double the finished surfaces required for one placed like mine, receiving the water axially through its open bottom and discharging it laterally through a hole in its side, or vice versa. I do not therefore claim a trap with a turn-cock, broadly, nor do I claim a trap alone nor an open-bottom turn-cock or valve alone, for both are old.

What I claim as my invention, and desire to secure by Letters Patent, is—

As an improved article of manufacture, a waste-pipe trap of uniform bore throughout, the delivery-bend of which is formed by a cylindrical open bottom and lateral-delivery turn cock or valve and its casing placed in the axial line of the trap and extended above the level of the discharge-opening, substantially as described.

Signed at New York city, in the county and State of New York, this 20th day of June, A. D. 1891.

FREDERICK N. DU BOIS.

Witnesses:
 W. J. MORGAN,
 A. P. THAYER.